US006903892B1

(12) United States Patent
Cates

(10) Patent No.: US 6,903,892 B1
(45) Date of Patent: Jun. 7, 2005

(54) MINIMIZATION OF TAPE REPOSITIONS USING MULTIPLE READ ELEMENTS PER TRACK

(75) Inventor: James C. Cates, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 218 days.

(21) Appl. No.: 10/280,621

(22) Filed: Oct. 25, 2002

(51) Int. Cl.[7] .................................................. G11B 5/09
(52) U.S. Cl. .......................................... 360/53; 360/63
(58) Field of Search ............................... 360/61–63, 22, 360/121, 31, 53

(56) References Cited

U.S. PATENT DOCUMENTS 5,353,176 A * 10/1994 Kosuge ....................... 360/63
6,084,735 A * 7/2000 Kawada et al. ............... 360/63
6,111,708 A * 8/2000 Jewell et al. .................. 360/31

* cited by examiner

Primary Examiner—Alan T. Faber
(74) Attorney, Agent, or Firm—Brooks Kushman P.C.

(57) ABSTRACT

The present invention decreases the number of repositions during read back by making use of multiple read elements associated with each data track. Each of a plurality of sets of read electronics receives the read signal from either one or the other of the two read elements associated with each data track and converts the received read signal into read data. For each data track, control logic selects one of the two read elements as a source for output data. In response to a determination that a read error has occurred, the control logic selects the other of the two read elements as the source for output data. For each data track, one read element is offset relative to the other read element in an offset direction normal to the tape direction.

14 Claims, 6 Drawing Sheets

MINIMIZATION OF TAPE REPOSITIONS USING MULTIPLE READ ELEMENTS PER TRACK

BACKGROUND OF THE INVENTION

1. Field of the Invention

The present invention relates to accessing data stored on tape.

2. Background Art

Tape is increasingly used as a data storage media due to its high volumetric data density and its low cost per bits stored. Typically, data is written onto tape with a tape head having a plurality of write elements for simultaneously writing data tracks. The tape head typically includes a plurality of read elements for simultaneously reading these data tracks. One tape head configuration includes two modules, each module having a plurality of write elements and associated read elements. The modules are arranged such that, for a given tape direction over the access head, the read elements precede the write elements on one module and the write elements precede the read elements on the other module. This configuration supports read-after-write in either tape direction.

When a tape access system is unable to read data written on the tape, the tape is typically rewound and an attempt is made to read the data again. This attempt is successful in most cases. However, this recovery effort takes a significant amount of time. The tape drive is required to stop the tape, run the tape backwards a small distance, stop the tape again, and then start the tape in the original direction of motion. This repositioning interrupts operation and causes performance degradation of the tape access system.

What is needed is to decrease the number of repositions during read back mode. Preferably, any decrease in repositions will be accomplished without significantly increasing the tape access system complexity.

SUMMARY OF THE INVENTION

The present invention decreases the number of repositions during read back by making use of multiple read elements associated with each data track.

To this end, a tape access system is provided. A tape head has two read elements associated with each data track to be simultaneously read. Each read element generates a read signal in response to information recorded on the data track. Each of a plurality of sets of read electronics receives the read signal from either one or the other of the two read elements associated with each data track and converts the received read signal into read data. For each data track, control logic selects one of the two read elements as a source for output data. In response to a determination that a read error has occurred, the control logic selects the other of the two read elements as the source for output data.

In an embodiment of the present invention, the two read elements comprise a leading read element preceding a trailing element in the tape direction. The control logic selects the trailing read element prior to determining that a read error has occurred and selects the leading read element after determining that a read error has occurred. A buffer holds read data generated by the leading read element. The control logic reads data from the buffer after determining that a read error has occurred.

In another embodiment of the present invention, the control logic selects the leading read element prior to determining that a read error has occurred and selects the trailing read element after determining that a read error has occurred.

In yet another embodiment of the present invention, each read element in the two read elements associated with each data track is offset relative to the other read element in an offset direction normal to the tape direction. A write element associated with one read element may be offset in the offset direction so as to be aligned in the offset direction with the other read element. A write element associated with the other read element may be offset in the offset direction so as to be aligned in the offset direction with the one read element.

A method of reading data written onto a plurality of data tracks is also provided. Each data track is accessed with a leading read element and a trailing read element. The leading read element accesses a particular location on the data track before the trailing read element accesses that particular location. Each read element generates a read signal. For each data track, output data is generated based on the read signals from the leading read element. If an error is determined, the output data is generated based on the read signals from the trailing read element.

A tape head for accessing a plurality of data tracks written along a length of a tape is also provided. The tape head includes a plurality of leading read elements, each leading read element accessing one data track, and a trailing read element corresponding to each leading read element. Each read element has a width less than the accessed data track width. Each trailing read element is offset across the width of the data track relative to the corresponding leading read element.

In an embodiment of the present invention, the tape head includes a plurality of write elements. Each write element is constructed as part of a leading read element and is offset across the width of the data track relative to the leading read element by an amount substantially the same as the amount that the corresponding trailing read element is offset across the width of the data track relative to the leading read element. Similarly, a write element may be constructed as part of a trailing read element with the write element offset across the width of the data track relative to the trailing read element by an amount substantially the same as the amount that the corresponding leading read element is offset across the width of the data track relative to the trailing read element.

The above features, and other features and advantages of the present invention are readily apparent from the following detailed descriptions thereof when taken in connection with the accompanying drawings.

DETAILED DESCRIPTION OF THE PREFERRED EMBODIMENTS

Figure 1:
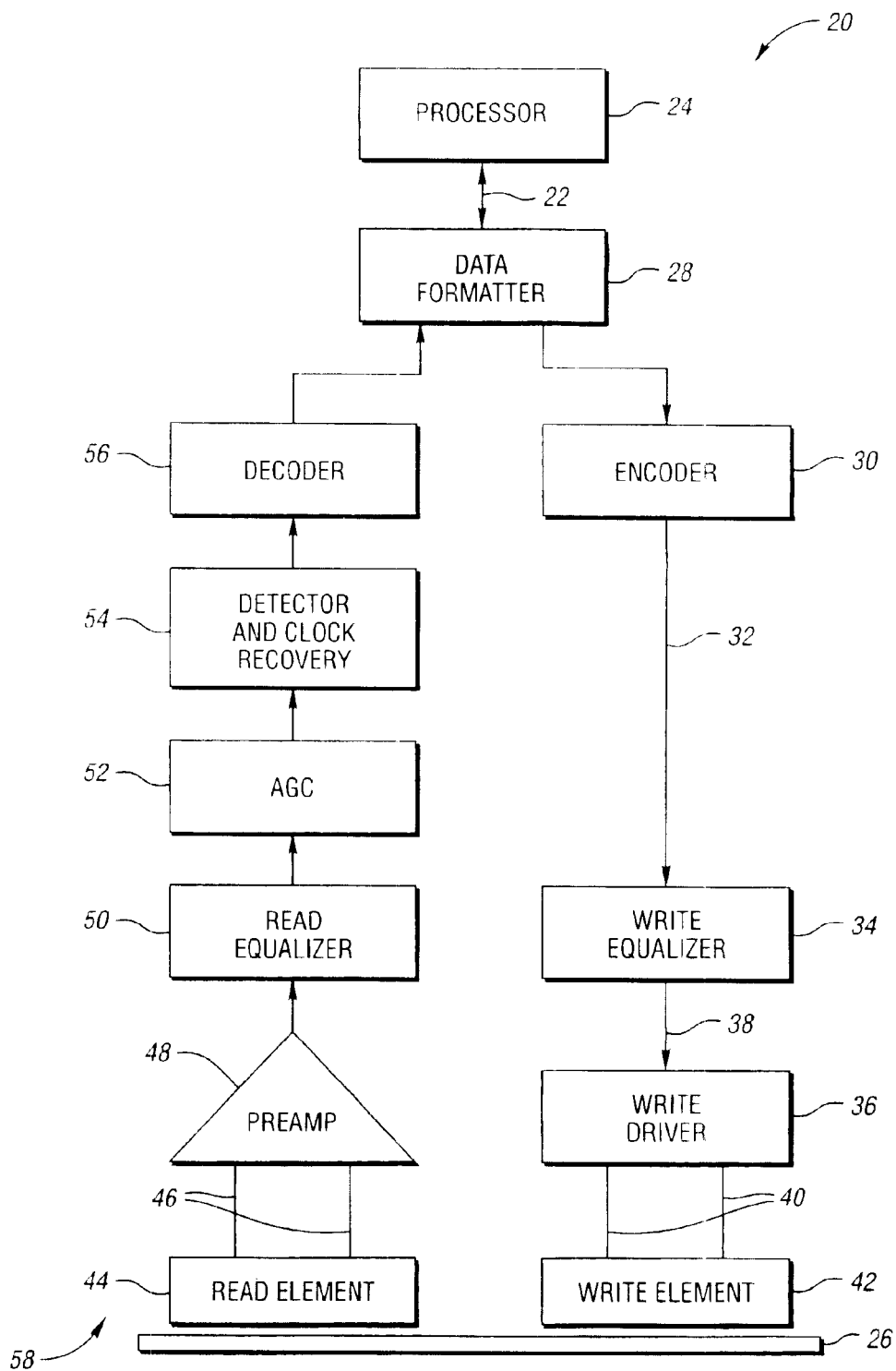
FIG. 1 is a block diagram illustrating tape access electronics that may be used with the present invention.

Referring to FIG. 1, a block diagram illustrating tape access electronics that may be used with the present invention is shown. A tape access system, shown generally by 20, processes data 22 from processor 24. Data to be written onto tape 26 is received by data formatter 28 which properly formats data 22. Formatting may include inserting special fields to identify each record as being unique, provide the record length, describe the compression status of the record, determine how data is to be spread across one or more tracks, and the like. Data formatter 28 may also perform block level error correction and detection. Formatted data is received by encoder 30 for further format conversion such as, for example, run length limited encoding. Encoder 30 produces write signal 32. Write equalizer 34 modifies write signal 32 in a manner that enables more robust detection during subsequent read operations. Write driver 36 converts write equalized signals 38 into write current 40 having alternating polarities. Write element 42 converts write currents 40 into a write field which writes data patterns onto tape 26.

Read element 44 generates read signals 46 in response to fields written on tape 26. Preamp 48 amplifies read output signals 46. If read element 44 is a magnetoresistive (MR) element, preamp 48 may also include a bias supply to provide the required bias for MR read element 44. Read equalizer 50 shapes amplified read signals 46. Shaping may include one or more of amplitude equalization as a function of frequency, pulse shaping to reduce the width of isolated pulses, low pass filtering to improve read signal-to-noise ratio, and the like. Automatic gain control (AGC) 52 normalizes the output of read equalizer 50. Typical read elements 44 exhibit variations in output amplitude. Also, system variations such as write current 40 amplitude, spacing between elements 42, 44 and tape 26, and the like contribute to amplitude variation. AGC 52 reduces these variations. Detector and clock recovery 54 accepts the magnitude normalized read signal and determines the location and time of recorded data transitions. Clock recovery determines the reference frequency and phase required to determine transition locations. Decoder 56 undoes the encoding performed by encoder 30. Data formatter 28 accepts the unencoded data stream and formats the data for reception by processor 24. The read electronics illustrated here, shown generally by 58, are typical of read electronics used in tape access systems 20. However, as will be recognized by one of ordinary skill in the art, the present invention applies to a wide variety of read electronics.

Figure 2:
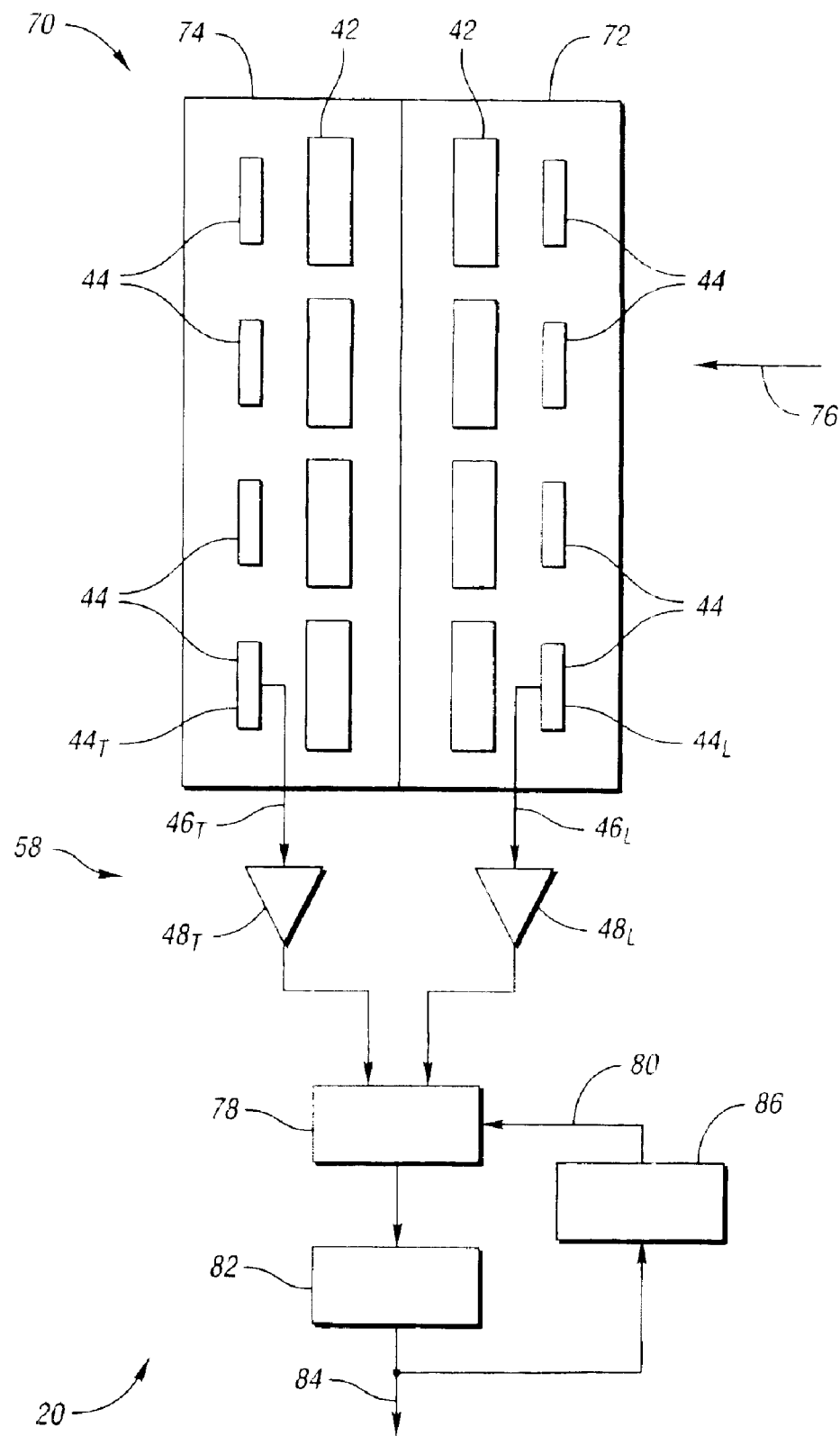
FIG. 2 is a schematic diagram of a tape access system according to an embodiment of the present invention.

Referring now to FIG. 2, a schematic diagram of a tape access system according to an embodiment of the present invention is shown. Tape system 20 includes a tape head, shown generally by 70, with leading module 72 and trailing module 74. Leading module 72 precedes trailing module 74 when accessing tape moving past tape head 70 in tape direction 76. Each module 72, 74, includes a plurality of write elements 42 and read elements 44. Typically, modules 72, 74 are arranged such that, for a given tape direction 76, read elements 44 precede write elements 42 in one module 72 and read elements 44 follow write elements 42 in the other module 74. Tape head 70 as illustrated includes read elements 44 and write elements 42 for accessing four data tracks simultaneously. As will be recognized by one of ordinary skill in the art, the number of data tracks simultaneously accessed may be varied within the scope of the present invention.

Read electronics 58 are illustrated for one data track. In an embodiment of the present invention, electronics 58 are duplicated for each data track. Electronics 58 for only one data track is shown for clarity. At least a portion of each set of electronics 58 is duplicated so that both leading read element $44_L$ and trailing read element $44_T$ are simultaneously supported. In the embodiment shown, read signals 46 from both read elements $44_L$, $44_T$ are amplified and fed into multiplexer 78. Select line 80 determines which input to multiplexer 78 is fed into electronics 82 which handle equalization, gain control, detection, decoding, formatting, and the like to generate output data 84. Control logic 86 monitors output data 84 for errors that would otherwise require a rewind recovery. Control logic 86 instead switches multiplexer 78 to obtain output data 84 from the other read element.

During operation in one embodiment of the present invention, control logic 86 causes output data 84 to be generated by leading read element $44_L$. When a read error occurs, control logic 86 switches multiplexer 78 to use trailing read element $44_T$ as the source for output data 84. Trailing read element $44_T$ has the chance to re-read the problematic portion of tape 26 on the fly. Trailing read element $44_T$ could continue to be the source of output data until the end of a file or until a reposition is required. At this point, control logic 86 switches back to leading read element $44_L$. Tape head 70 is constructed such that leading read element $44_L$ is separated from trailing read element $44_T$ by a sufficient distance to allow error detection of output data 84 and subsequent switching of multiplexer 78. This spacing depends on the format of data recorded, linear recording density, tape speed, geometry of tape head 70, and the like.

Figure 3:
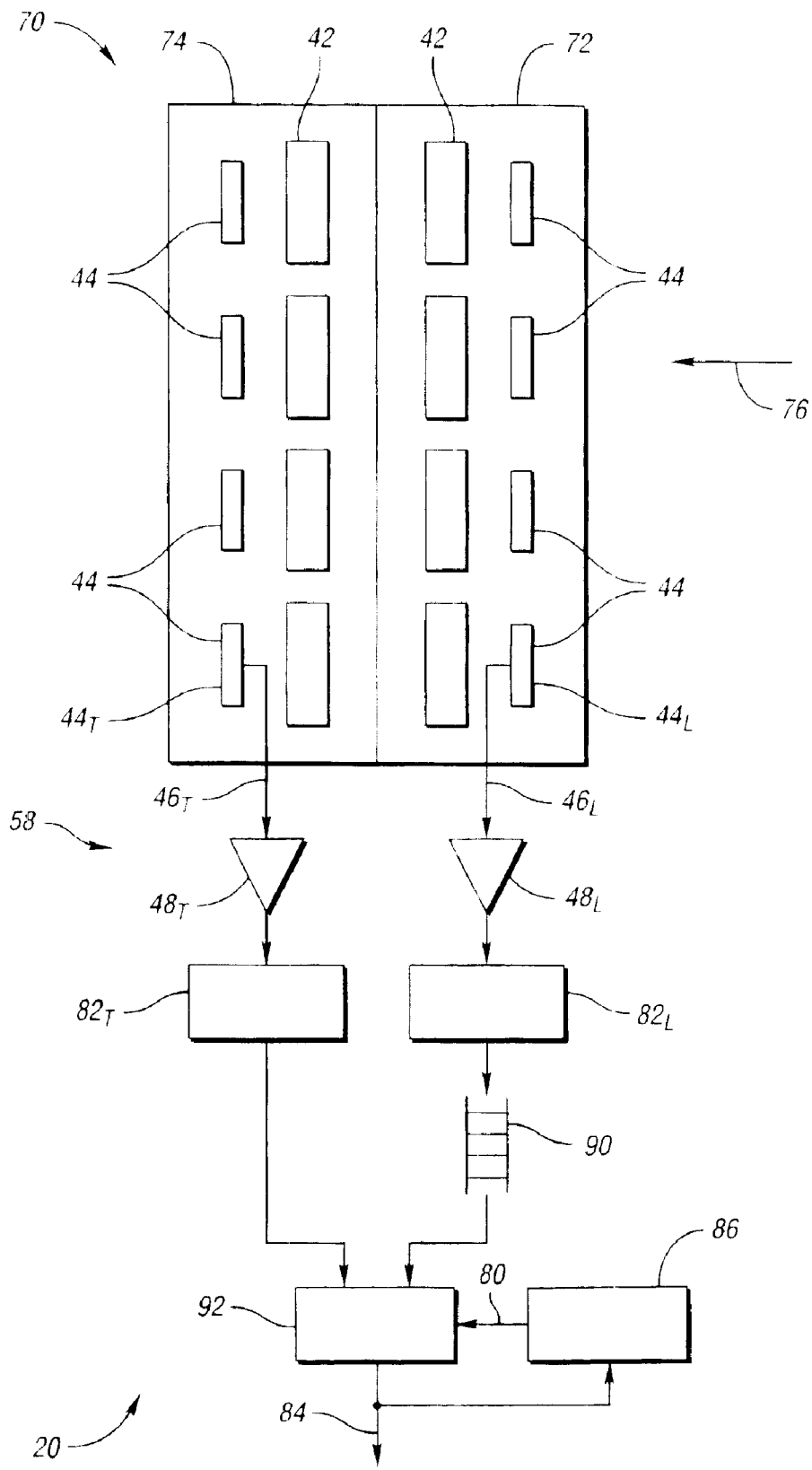
FIG. 3 is a schematic diagram of a tape access system with buffered read elements according to an embodiment of the present invention.

Referring now to FIG. 3, a schematic diagram of a tape access system with buffered read elements according to an embodiment of the present invention is shown. In this embodiment, each read element 44 has its own substantially complete set of read electronics 58. During operation, control logic 86 commands multiplexer 92 to select trailing read element $44_T$ as the source for output data 84. Meanwhile, data generated by leading read element $44_L$ is held in buffer 90. If output data 84 from trailing read element $44_T$ is determined to be erroneous, control logic 86 can splice in good data from buffer 90 read by leading read element $44_L$. When trailing read elements $44_T$ continue correctly reading the data stream, buffer 90 can be emptied and refilled with additional data from leading read element $44_L$. Alternatively, buffer 90 can be implemented as a first in-first out buffer.

Figure 4:
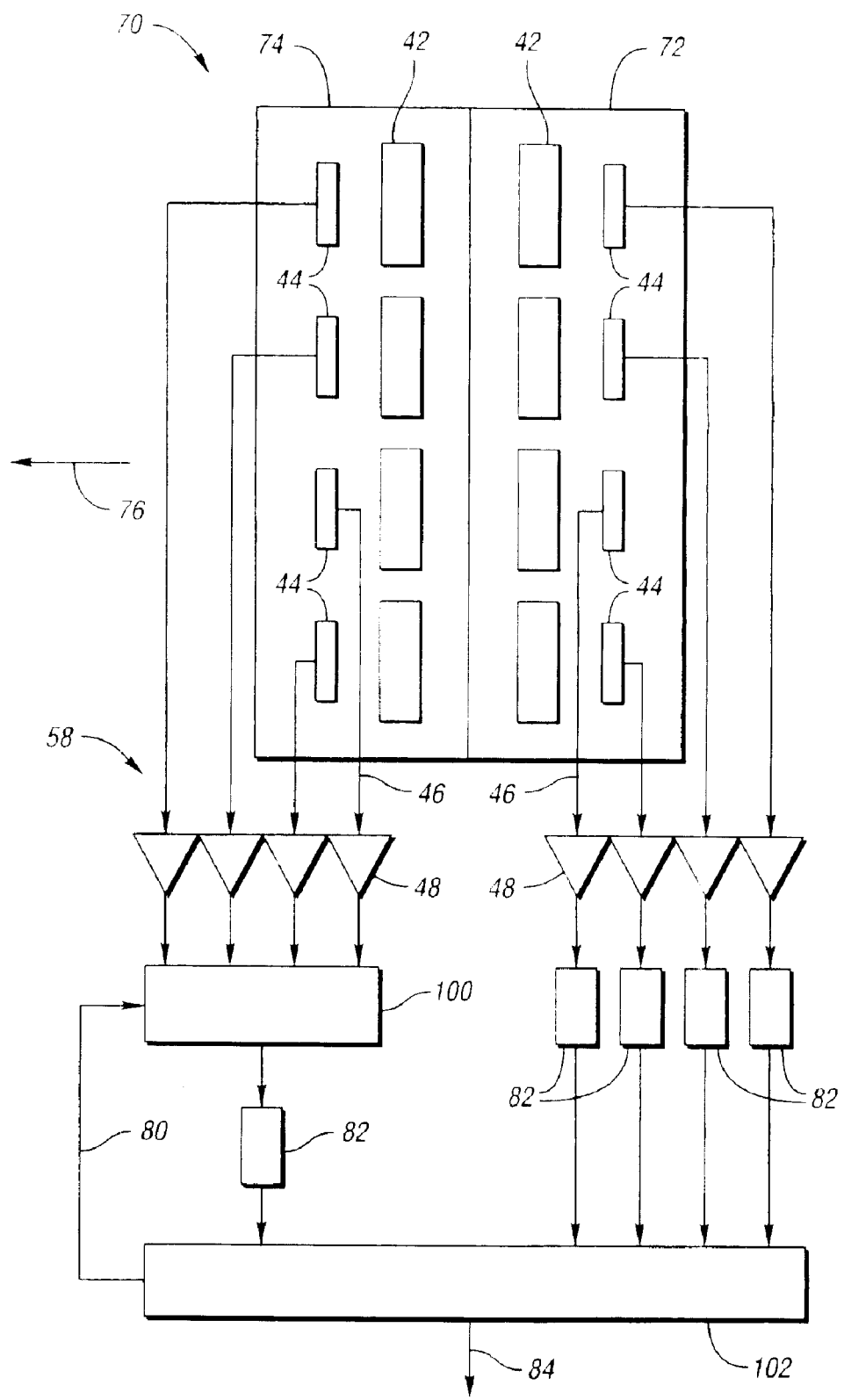
FIG. 4 is a schematic diagram of a tape access system with a full set of primary read access elements and less than a full set of recovery read access elements according to an embodiment of the present invention.

Referring now to FIG. 4, a schematic diagram of a tape access system with full set of primary read access elements and less than a full set of recovery read access elements according to an embodiment of the present invention is shown. The amount of electronics 82 required may be reduced by multiplexing readers 44 employed in error recovery. Typically, a defect will affect only a subset of data tracks that are simultaneously read by tape head 70. Thus, information from only one or two channels is needed to avoid a rewind recovery. In the embodiment shown, each read element 44 in leading module 72 has a substantially complete set of electronics 82. In contrast, read elements 44 in trailing module 74 have fewer sets of read electronics 82 than read elements 44. Thus, if N is the number of data channels to be simultaneously read and y is the number of sets of electronics 82 supporting trailing module 74, y can be expressed as 0<y<N.

Select line 80 for multiplexer 100 selects between read elements 44 in trailing module 74 to be serviced by electronics 82. Control logic 102 which may be, for example, data formatter 28, generates multiplexing control signal 80. Since rewind avoidance is being performed by a subset of trailing readers 44, control logic 102 can note which blocks are in error and select which channel from trailing module 74 to use in a recovery attempt. Control logic 102 generates output data 84 using read signals 46 from leading module 72 corrected by information from trailing module 74 as needed.

Figure 5:
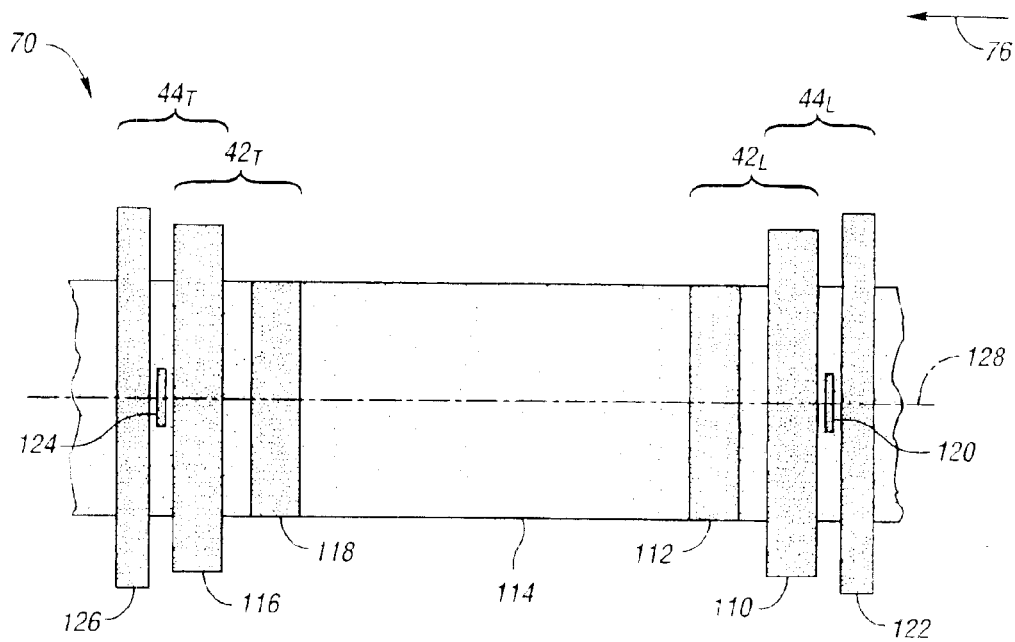
FIG. 5 is a schematic diagram illustrating a tape access head having aligned elements that may be used with the present invention.

Referring now to FIG. 5, a schematic diagram illustrating a tape access head having aligned elements that may be used with the present invention is shown. Leading write element $42_L$ includes long pole 110 and short pole 112. The width of data track 114 written by write element $42_L$ is determined by the width of short pole 112. Similarly, trailing write element $42_T$ is formed by long pole 116 and short pole 118. Leading read element $44_L$ includes MR sensor 120 shielded by long pole 110 and read shield 122. Similarly, trailing read element $44_T$ includes MR sensor 124 shielded by long pole 116 and read shield 126. In a typical read head, each of elements 110, 112, 116, 118, 120, 122, 124, 126 is centered in a direction normal to tape direction 76 about centerline 128. One difficulty with this arrangement is that any defect on data track 114 will be sensed by MR sensor 120 and MR sensor 124 in approximately the same manner. Construction of elements 110, 112, 116, 118, 120, 122, 124, 126 is well known in the art of tape access systems.

Figure 6:
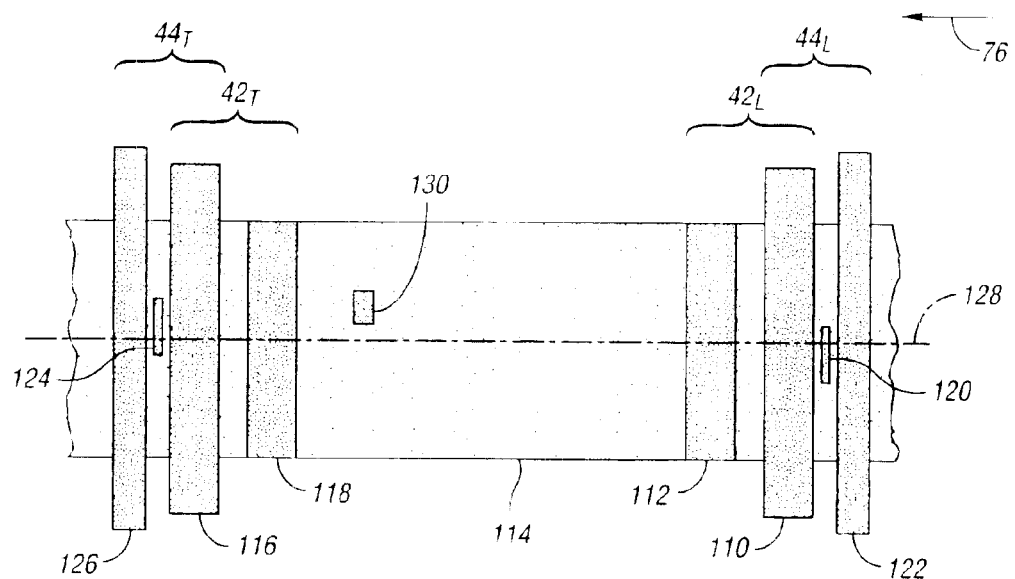
FIG. 6 is a schematic diagram illustrating a tape access head having offset read elements that may be used with the present invention.

Referring now to FIG. 6, a schematic diagram illustrating a tape access head having offset read elements that may be used with the present invention is shown. In FIG. 6, data track 114 includes defect 130. To minimize the effect of defect 130, MR element 120 is offset across the width of data track 114 relative to read element 124. Thus, the effect of defect 130 will be different on leading read element $44_L$ than on trailing read element $44_T$. Effectively offsetting read elements $44_L$, $44_T$ increases the chance that one or the other of read elements $44_L$, $44_T$ will generate data signal 46 free of error.

Figure 7:
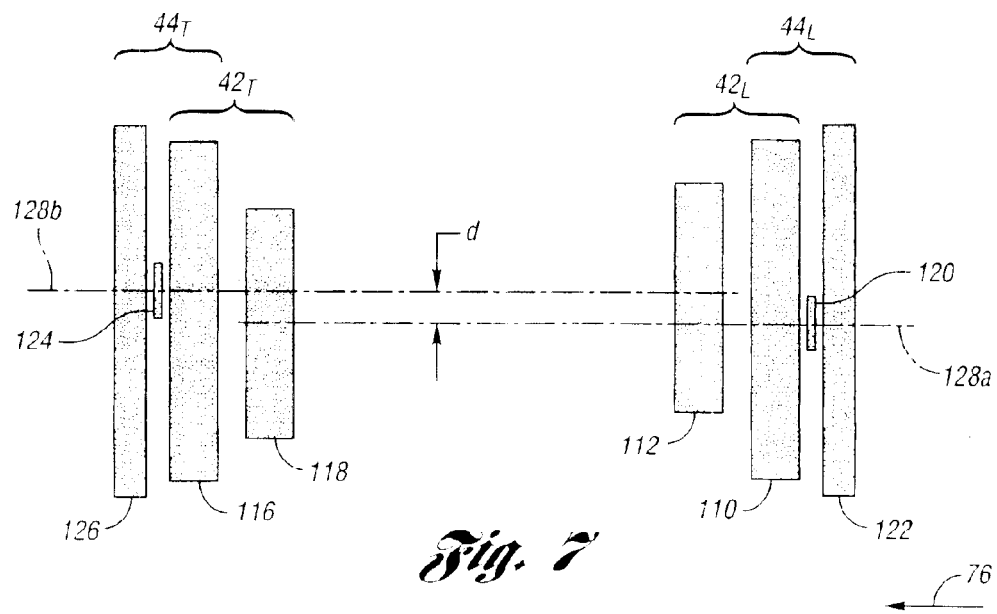
FIG. 7 is a schematic diagram illustrating a tape access head with offset read and write elements that may be used with the present invention.

Referring now to FIG. 7, a schematic diagram illustrating a tape access head with offset read and write elements that may be used with the present invention is shown. Leading read element $44_L$ and trailing write element $42_T$ are centered about centerline 128a. Trailing read element $44_T$ and leading write element $42_L$ are centered about centerline 128b. Centerlines 128a, 128b are separated in a direction normal to tape direction 76 by separation distance d.

Figure 8:
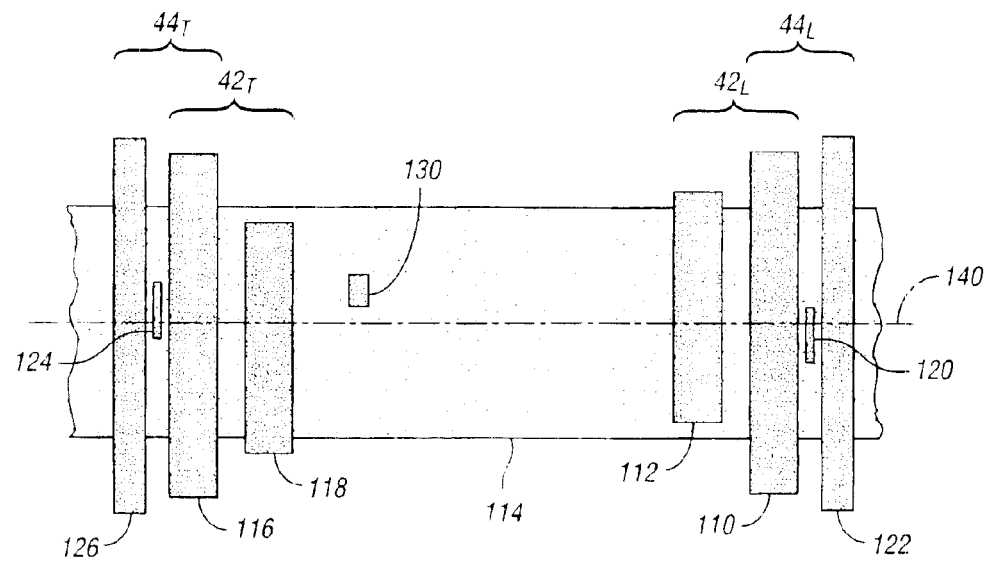
FIG. 8 is a schematic diagram illustrating read access with a tape head having offset read and write elements.

Referring now to FIG. 8, a schematic diagram illustrating read access with a tape head having offset read and write elements is shown. During read of data track 114, leading read element $44_L$ and trailing read element $44_T$ are each offset from data track centerline 140 by one half of the separation distance between centerlines 128a, 128b. This positioning keeps read elements $44_L$, $44_T$ well within data track 114.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape access system comprising:
   a tape head comprising two read elements associated with each data track to be simultaneously read, each read element generating a read signal in response to information recorded on the data track;
   a plurality of sets of read electronics, each set of read electronics operative to receive the read signal from either one or the other of the two read elements associated with each data track and to convert the received read signal into read data; and
   control logic in communication with the read electronics, the control logic operative to
   (a) for each data track, select one of the two read elements as a source for output data,
   (b) determine that a read error has occurred in read data generated by the selected read element, and
   (c) in response to the determined read error, select the other of the two read elements as the source for output data.

2. A tape access system as in claim 1 wherein the tape travels past the tape head in a tape direction, the two read elements being a leading read element preceding a trailing element in the tape direction, the control logic operative to select the trailing read element prior to determining that a read error has occurred and selecting the leading read element after determining that a read error has occurred.

3. A tape access system as in claim 2 further comprising a buffer in communication with the read electronics for the leading read element, the buffer holding read data generated by the leading read element, the control logic operative to read data from the buffer after determining that a read error has occurred.

4. A tape access system as in claim 1 wherein the tape travels past the tape head in a tape direction, the two read elements being a leading read element preceding a trailing element in the tape direction, the control logic operative to select the leading read element prior to determining that a read error has occurred and selecting the trailing read element after determining that a read error has occurred.

5. A tape access system as in claim 1, the tape traveling past the tape head in a tape direction, wherein each read element in the two read elements associated with each data track is offset relative to the other read element in an offset direction normal to the tape direction.

6. A tape access system as in claim 5 further comprising a write element associated with each read element, each write element operative to write information onto the data track.

7. A tape access system as in claim 6 wherein the write element associated with one read element is offset in the offset direction so as to be aligned in the offset direction with the other read element.

8. A tape access system as in claim 7 wherein the write element associated with the other read element is offset in the offset direction so as to be aligned in the offset direction with the one read element.

9. A method of reading data written onto a plurality of data tracks, the method comprising:
   accessing each data track with a leading read element and a trailing read element in relation to a tape direction, the leading read element accessing a particular location on the data track before the trailing read element accesses that particular location, each read element generating a read signal;

for each data track, generating output data based on the read signals from the leading read element;

determining if an error occurs in the generated output data; and if an error is determined, generating the output data based on the read signals from the trailing read element without reversing the tape direction.

10. A method of reading data written onto at least one data track as in claim 9 wherein the leading read element is offset from the trailing read element in a direction parallel to a width of the data track.

11. A system for accessing data stored on a tape, the system comprising:

a tape head operative to access a plurality of data tracks on the tape, the tape head comprising two read/write modules, each read/write module comprising a read element and a write element for accessing each data track, the read/write modules positioned such that, for a given tape direction, each data track moves past a leading read element and a leading write element on one write module and a trailing read element and a trailing write element on the other write module;

read electronics in communication with the read elements, the read electronics operative to receive electrical signals from read elements and generate data based on the received electrical signals, the read electronics including separate read electronics for each trailing read element and separate read electronics for each leading read element; and control logic in communication with the read electronics, the control logic operative to
  (a) output data generated by the leading read elements,
  (b) determine if the output data is erroneous, and
  (c) if the output data is erroneous, output data generated by at least one trailing read element.

12. A system for accessing data as in claim 11 wherein the read electronics comprise common read electronics for each trailing read element and corresponding leading read element.

13. A system for accessing data as in claim 11 wherein the trailing read element is offset from the leading read element across a width of the data track in a direction normal to the tape direction.

14. A system for accessing data as in claim 13 wherein the trailing write element is aligned with the leading read element across the width of the data track and the leading write element is aligned with the trailing read element across the width of the data track.

* * * * *